Oct. 11, 1932.  H. G. JOHNSTONE  1,881,640
TABULATING SYSTEM
Filed Aug. 28, 1928  6 Sheets-Sheet 1

Fig. 1.

Oct. 11, 1932.  H. G. JOHNSTONE  1,881,640
TABULATING SYSTEM
Filed Aug. 28, 1928  6 Sheets-Sheet 3

Inventor
Harold G. Johnstone
by H. A. Patterson Att'y

Oct. 11, 1932.   H. G. JOHNSTONE   1,881,640
TABULATING SYSTEM
Filed Aug. 28, 1928    6 Sheets-Sheet 4

Inventor
Harold G. Johnstone
by H. A. Pattison, Att'y.

Oct. 11, 1932.  H. G. JOHNSTONE  1,881,640
TABULATING SYSTEM
Filed Aug. 28, 1928    6 Sheets-Sheet 5

Oct. 11, 1932. H. G. JOHNSTONE 1,881,640
TABULATING SYSTEM
Filed Aug. 28, 1928 6 Sheets-Sheet 6

Inventor
Harold G. Johnstone
by _______ Att'y

Patented Oct. 11, 1932

1,881,640

UNITED STATES PATENT OFFICE

HAROLD GLENN JOHNSTONE, OF OAK PARK, ILLINOIS, ASSIGNOR TO WESTERN ELECTRIC COMPANY, INCORPORATED, OF NEW YORK, N. Y., A CORPORATION OF NEW YORK

TABULATING SYSTEM

Application filed August 28, 1928. Serial No. 302,464.

This invention relates to tabulating systems, and more particularly to electrically operated systems for selectively tabulating and summarizing statistical information.

It is the practice, in some instances, as for example in industrial or manufacturing establishments where voluminous data or statistics are accumulated each day, to record such data, as they are obtained, upon suitable record sheets or cards from which the data are subsequently transcribed and tabulated into cumulative records or reports conveniently situated for inspection by superintendents, supervisors or other persons who may be interested in such data. Thus, in keeping shop records it is common practice to assign an individual order number to each manufacturing order or job at the time it is issued. Each job is thereafter identified by the particular order number assigned thereto, which order number is indicated upon suitable record sheets or cards, upon which is recorded the desired statistical information or data relating to that particular order or job. In manufacturing establishments where more than one kind of part or product is manufactured, it is sometimes the practice to set aside or reserve a group of order numbers for each part. In such instances, the order number assigned to a particular job is selected from the group previously set aside for the particular part which is to be manufactured under that job.

In order to efficiently control the production and operating cost of manufacturing establishments it is obviously essential that an up-to-date record or summary of certain manufacturing data be maintained for convenient inspection by those persons in charge of production. Such data may consist of an up-to-date cumulative record of the number of parts manufactured under each individual order number and the total cost of manufacturing such parts. It is also desirable, in some instances, to keep a cumulative record of the manufacturing data relating to each group of order numbers. In some instances the order number of the job and the data or statistical information relating thereto are indicated upon the record card by perforating the card in certain previously designated columns at the time such information is available, the extent of the information being indicated by the positions of such perforations. These perforated cards are subsequently delivered to an accounting or compiling department and the information contained thereon is transcribed and selectively tabulated into a cumulative record.

Tabulating systems of the type now used require the expenditure of considerable time to properly transcribe and selectively tabulate the data or information from the record cards since it is necessary, before such data can be transcribed from the record cards and accurately tabulated, that the record cards be sorted according to certain groups of order numbers and also according to each individual order number. The time lag thus experienced causes delays in the final recording and summarizing of statistics which materially reduces their practical application, especially in instances where a large volume of data must be quickly recorded.

Objects of the present invention are to provide a highly efficient and flexible system for expeditiously selecting, recording and summarizing statistical information.

The invention contemplates the provision of an electrically operated system controlled by the perforations in the record sheets or cards above referred to for selectively transcribing and tabulating the statistical information expressed on the record cards. In accordance with the general features of the invention as embodied in an apparatus for selectively recording and summarizing manufacturing data according to order numbers and certain groups of order numbers, one embodiment of the invention provides a card feed mechanism comprising a plurality of cooperating feed rollers, which advance the previously perforated record cards between cooperating electrical contact brushes. Certain of the contact brushes are arranged to explore those columns of the card wherein the order number is expressed by perforations. As the card is advanced these contact brushes make contact through the perforations thereby closing certain electrical circuits which select registers corresponding to the designated order number and condition for operation the electrical circuits of the selected registers. As the card continues to advance, other contact brushes are arranged to explore other columns thereof wherein the manufacturing data are expressed by perforations. These latter contact brushes make contact through the perforations thereby closing the previously conditioned operating circuits of the selected registers whereupon the manufacturing data designated upon the card by the perforations are transcribed and tabulated by the previously selected registers. Means is provided for summarizing the manufacturing data according to certain previously determined classes or groups of order numbers.

Other novel features and advantages of the invention will become apparent in the following detailed description, reference being had to the accompanying drawings, wherein.

In the drawings and throughout the specification like reference numerals are employed to designate corresponding parts.

Figures 3, 4, 12, 13, 14, 15:
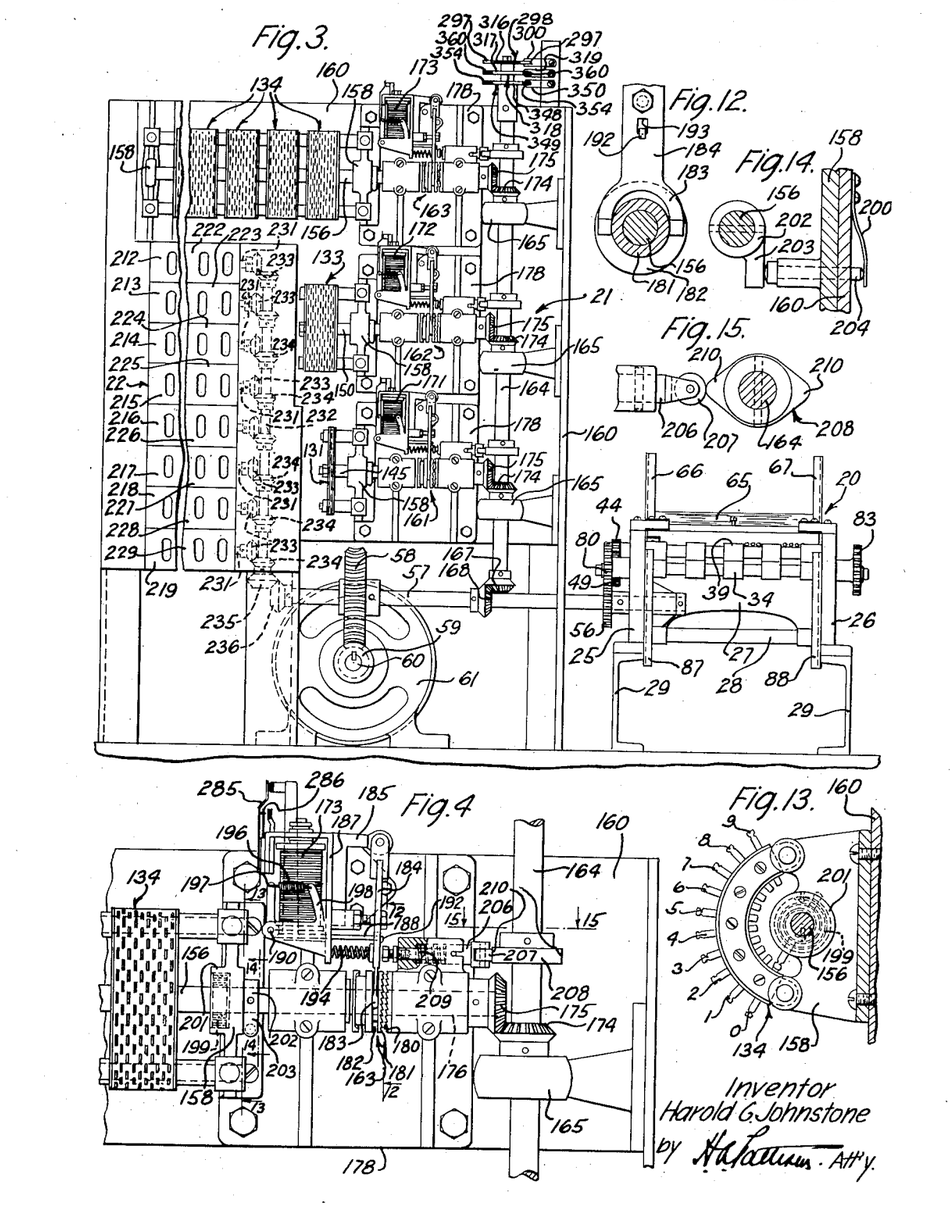
Fig. 3 is a front elevational view, partly broken away, of a tabulating apparatus embodying the features of the invention.
Fig. 4 is an enlarged fragmentary elevational view of a portion of the structure shown in Fig. 3.
Fig. 12 is an enlarged fragmentary detail section taken on line 12—12 of Fig. 4.
Fig. 13 is a fragmentary detail section taken on line 13—13 of Fig. 4.
Fig. 14 is an enlarged fragmentary detail section taken on line 14—14 of Fig. 4.
Fig. 15 is an enlarged fragmentary detail section taken on line 15—15 of Fig. 4.

Referring particularly to Fig. 3 of the drawings, it will be observed that the improved tabulating system comprises a card feed mechanism indicated generally by the reference numeral 20, a selecting mechanism indicated generally by the reference numeral 21, and a registering mechanism indicated generally by the reference numeral 22. It is believed that the invention will be clearly understood if these mechanisms are described in detail in the order in which each performs its particular function, concluding with a general statement of the operation of the entire system.

*Card feed mechanism*

Figure 5:
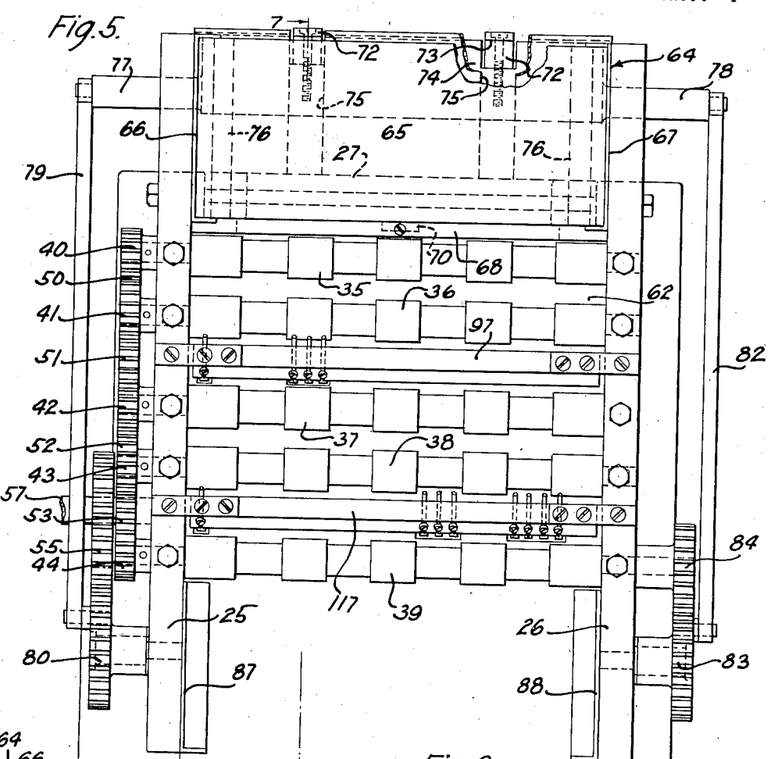
Fig. 5 is a plan view of the card feed mechanism.
Figure 6:
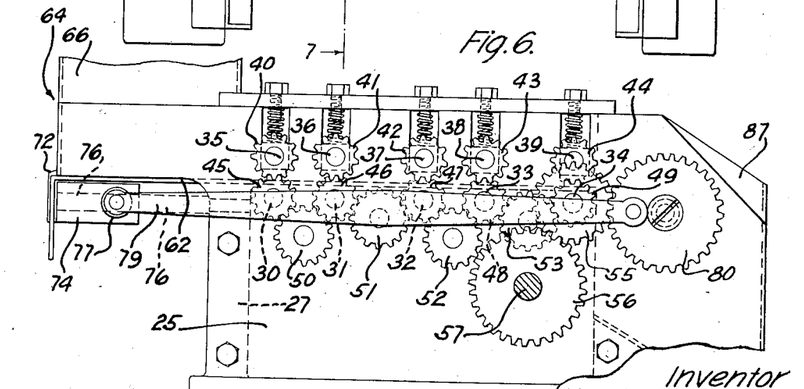
Fig. 6 is a side elevational view of the structure shown in Fig. 5.
Figure 7:
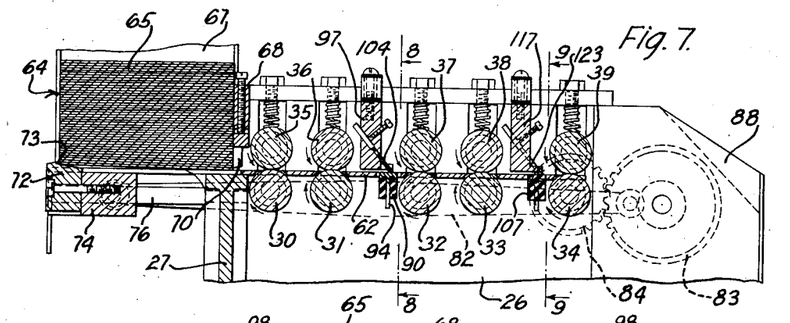
Fig. 7 is a fragmentary vertical section taken on line 7—7 of Fig. 5.

The main suporting framework for the card feed mechanism 20 comprises a pair of spaced vertical side members 25 and 26 rigidly interconnected by means of a cross member 27 and a tie rod 28 and supported upon a pair of spaced channel members 29, 29 (Figs. 3, 5 and 7). Rotatably journaled in the frame members 25 and 26 are a plurality of lower card feed rollers 30, 31, 32, 33 and 34 (Figs. 6 and 7) which cooperate with upper card feed rollers 35, 36, 37, 38 and 39, respectively. The upper feed rollers are journaled in suitable bearing blocks vertically slidable in the frame members 25 and 26 and are arranged to yieldably engage the cooperating lower feed rollers in a manner well known in the art (Fig. 6).

The means for driving the upper and lower feed rollers is as follows: Gears 40, 41, 42, 43 and 44 secured to the upper feed rollers mesh with similar gears 45, 46, 47, 48 and 49, respectively, secured to the lower feed rollers (Fig. 6). These latter gears are interconnected by intermediate gears 50, 51, 52 and 53 carried upon suitable stud shafts rotatably journaled in the frame member 25. As clearly shown in Fig. 6, gear 50 meshes with gears 45 and 46, gear 51 meshes with gears 46 and 47, gear 52 meshes with gears 47 and 48, and gear 53 meshes with gears 48 and 49. A gear 55 secured to the lower feed roller 34 meshes with a gear 56 secured to a horizontal shaft 57. A worm gear 58 also secured to the shaft 57 (Fig. 3) meshes with a worm 59 carried upon a main drive shaft 60 which is driven by an electric motor 61. It will be understood that the arrangement of the above described gearing is such that the feed rollers are all positively driven at the same speed and in the direction indicated by the arrows (Fig. 7).

Figures 8, 9:
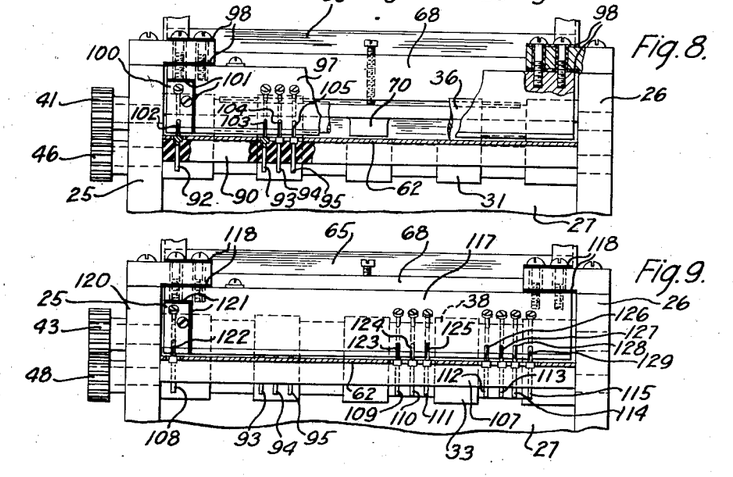
Fig. 8 is a fragmentary vertical section taken on line 8—8 of Fig. 7.
Fig. 9 is a fragmentary vertical section taken on line 9—9 of Fig. 7.

Disposed between the upper and lower feed rollers is a horizontal supporting plate 62 which serves to support the cards as they are advanced by the feed rollers. This supporting plate is provided with suitable slots for accommodating the card engaging portions of the feed rollers. One end of the horizontal plate 62 projects beyond the first pair of feed rollers 30 and 35 and constitutes the bottom plate of a suitable hopper 64 for holding a supply of record cards 65. The cards are confined between oppositely disposed channel members 66 and 67 of the hopper 64, which channel members are secured to forwardly projecting end portions of the frame members 25 and 26, respectively (Fig. 5). Disposed between the hopper and the feed rollers is a vertical cross plate 68 which is secured to the frame members 25 and 26, its lower edge being suitably spaced from the card supporting plate 62 (Figs. 7 and 8). An adjustable guide finger 70 depending from the bottom of the card plate 68 intermediate its end cooperates with the horizontal plate 62 to provide a restricted throat which permits the passage of only one card at a time.

The cards are advanced from the bottom of the hopper 64 between the guide finger 70 and the plate 62, and into operative engagement with the feed rollers by means of a pair of feed fingers 72, 72 (Fig. 5). These feed fingers are mounted upon a reciprocable carrier 74 disposed immediately below the card supporting plate 62, said plate being provided with suitable slots 75 through which the card engaging portions of the feed fingers project above the upper surface of the supporting plate. Referring particularly to Fig. 7, it will be observed that the upper surfaces of the feed fingers 72 are notched as indicated at 73 so as to engage the edge of only the lowermost card in the hopper 64. The carrier 74 is slidably mounted upon horizontal guide bars 76, 76 secured to the frame member 27 and is provided with reduced end portions 77 and 78 (Fig. 5) which project outwardly from the frame members 25 and 26, respectively. A connecting link 79 is pivoted at one end to the outwardly projecting portion 77 of the carrier 74 and is eccentrically pivoted at its opposite end to a gear 80 which is suitably journaled in the frame member 25 and meshes with the gear 55 (Figs. 5 and 6). A connecting link 82, similar to the link 79, is pivoted at one end to the outwardly projecting portion 78 of the carrier 74 and is eccentrically pivoted at its opposite end to a gear 83 similar to the gear 80. The gear 83 is suitably journaled in the frame member 26 and meshes with a gear 84 secured to the feed roller 34, the gear 84 being similar to the gear 55. From the construction just described it will be understood that the feed fingers 72 are caused to make one complete reciprocation for each revolution of the gears 80 and 83. The gearing arrangement is such that upon becoming engaged by the feed rollers, the cards are advanced by the feed fingers 72 at the same speed as they are advanced by the feed rollers. After passing between the last pair of feed rollers 34 and 39, the cards drop into a collecting chute which, as shown in Fig. 5, comprises a pair of oppositely disposed vertical side plates 87 and 88 secured to the frame members 25 and 26, respectively.

Disposed immediately below the horizontal supporting plate 62 and between the lower feed rollers 31 and 32 is a cross bar 90 which is composed of any suitable insulating material and is suitably secured to the frame members 25 and 26 (Figs. 7 and 8). Mounted at one end of the cross bar 90 is an electrical contact member 92. A plurality of spaced electrical contact members 93, 94 and 95, similar to the contact member 92, are also mounted in the insulating cross bar 90. As clearly shown in Fig. 8 the contact members 92, 93, 94 and 95 are provided with enlarged head portions which project through suitable slots to the upper surface of the horizontal supporting plate 62. Portions of the contact members 92 to 95, inclusive, project below the cross bar 90 whereby they are electrically interconnected with the selecting mechanism, as hereinafter described in detail.

A cross bar 97 of any suitable electrical conducting material is secured to the frame members 25 and 26 and is suitably insulated therefrom, as indicated at 98—98 (Fig. 8). The cross bar 97 is notched at one end to accommodate a metallic block or insert 100 which is suitably insulated from the cross bar, as indicated at 101. An electrical contact brush 102 carried by the metallic insert 100 is adapted to yieldably engage the contact member 92, and spaced electrical contact brushes 103, 104 and 105 carried by the cross bar 97 are adapted to yieldably engage the contact members 93, 94 and 95, respectively. The electrical contact brushes 102 to 105, inclusive, are electrically interconnected with the selecting mechanism, as hereinafter described in detail. The contact brushes 103, 104 and 105 together with their associated contact members 93, 94 and 95, respectively, may be described as constituting circuit controlling members which control certain electrical circuits which, in turn, operate the selecting mechanism to select certain predetermined registers in accordance with the positions of those perforations in the record card which designate the order number.

A cross bar 107, similar to the cross bar 90, is secured to the frame members 25 and 26 intermediate the lower feed rollers 33 and 34 (Figs. 7 and 9). Carried at one end of the cross bar 107 is an electrical contact member 108, and conveniently spaced from the contact member 108 is a group of spaced electrical contact members 109, 110 and 111. A second group of spaced electrical contact members 112, 113, 114 and 115 are also mounted in the cross bar 107 and are suitably spaced from the first group of contact members. By referring to Fig. 9, it will be observed that the contact members 108 to 115, inclusive, are provided with enlarged head portions which project through suitable slots to the upper surface of the supporting plate 62. Portions of the contact members 108 to 115, inclusive, project below the cross bar 107 so that they may be conveniently interconnected with the registering mechanism, as hereinafter described in detail. A cross bar 117, similar to the cross bar 97, is disposed between the upper feed rollers 38 and 39, and is secured to the frame members 25 and 26, being suitably insulated therefrom, as indicated at 118—118 (Fig. 9). The cross bar 117 is notched at one end to accommodate a metallic block or insert 120 which is suitably insulated from the cross bar, as indicated at 121. An electrical contact brush 122 is mounted in the metallic insert 120 and is adapted to yieldably engage the electrical contact member 108. Electrical contact brushes 123, 124 and 125 carried by the cross bar 117 are adapted to yieldably engage the contact members 109, 110 and 111, respectively, and electrical contact brushes 126, 127, 128 and 129, also carried by the cross bar 117, are adapted to yieldably engage the contact members 112, 113, 114 and 115, respectively. The electrical contact brushes 122 to 129, inclusive, are electrically interconnected with the registering mechanism, as hereinafter more fully described. The contact brushes 123 to 129, inclusive, together with their associated contact members 109 to 115, inclusive, may be described as constituting circuit controlling members which control the operation of the previously selected registers in accordance with the positions of those perforations in the record card designating the data to be recorded.

*Selecting mechanism*

The selecting mechanism herein illustrated and described is capable of selecting any three digit number. It should be understood, however, that the system may be modified or extended to select numbers having less or more than three digits without departing from the spirit and scope of the invention.

Referring particularly to Fig. 3 it will be observed that the selecting mechanism 21 comprises a selector switch 131 hereinafter referred to as the hundreds selector, a bank 133 of selector switches, hereinafter referred to as the tens selector and a plurality of banks 134, 134 of selector switches, hereinafter referred to as the units selector. As diagrammatically shown in Fig. 1, the hundreds selector 131 includes a selector arc 132 comprising ten contact terminals arranged in arcuate formation and numbered consecutively 0, 1, 2, 3, etc., to 9, inclusive. A tens selector arc is provided for each of the 10 terminals of the hundreds selector arc 132 and each of the tens selector arcs comprises 10 contact terminals arranged in arcuate formation and numbered consecutively 0, 1, 2, 3, etc., to 9, inclusive. Two of the tens selector arcs are shown diagrammatically in Fig. 1 and are designated by the reference numerals 136 and 137. A units selector arc is provided for each terminal of each of the tens selector arcs and each of the units selector arcs comprises 10 contact terminals arranged in arcuate formation and numbered consecutively 0, 1, 2, 3, etc., to 9, inclusive. Four of the units selector arcs are shown diagrammatically in Fig. 1 and are designated by the reference numerals 139, 140, 141 and 142.

Associated with the hundreds selector arc 132 is an electrical contact brush 144 (Fig. 1), hereinafter referred to as the hundreds selector brush. This selector brush is secured to a horizontally disposed shaft 145 and is adapted upon rotation of this shaft to selectively engage one of the terminals of the hundreds selector arc 132. Associated with each of the tens selector arcs is an electrical contact brush, hereinafter referred to as the tens selector brushes. Two of the tens selector brushes are shown diagrammatically in Fig. 1 and are designated by the reference numerals 147 and 148. The tens selector brushes are all secured to a common horizontally disposed shaft 150 and are adapted upon rotation of this shaft to selectively engage corresponding terminals of the tens selector arcs. Similarly associated with each of the units selector arcs is an electrical contact brush, hereinafter referred to as the units selector brushes. Four of the units selector brushes are shown diagrammatically in Fig. 1 and are designated by the reference numerals 152, 153, 154 and 155. The units selector brushes are all secured to a common horizontally disposed shaft 156 and are adapted upon the rotation of this shaft to selectively engage corresponding terminals of the associated units selector arcs.

As shown in Fig. 3, the horizontal shafts 145, 150 and 156 which carry the hundreds, tens and units selector brushes, respectively, as hereinbefore described, are rotatably journaled in suitable supporting brackets 158—158 secured to a main supporting frame 160, and are operatively connected through clutches 161, 162 and 163, respectively, to a vertically disposed shaft 164. The shaft 164 is rotatably journaled in suitable supporting brackets 165, 165 secured to the main frame 160. A bevel gear 167 secured to the lower end of the vertical shaft 164 meshes with a similar gear 168 secured to the horizontal shaft 57 whereby the vertical shaft 164 is continuously driven in synchronism with the card feed mechanism. The construction is such that the vertical shaft 164 makes one-half revolution for each card that is advanced by the card feed mechanism. The reason for this arrangement will become apparent as the detailed description progresses.

The operation of the clutch 161 is controlled by an electromagnetic relay 171, hereinafter referred to as the hundreds selector relay. Likewise, the operation of the clutch 162 is controlled by an electro-magnetic relay 172, hereinafter referred to as the tens selector relay, and the operation of the clutch 163 is controlled by an electro-magnetic relay 173, hereinafter referred to as the units selector relay. The operating mechanisms for the clutches 161, 162 and 163 are similar in construction and in operation. Accordingly, the same reference numerals have been employed to designate corresponding parts of each of these mechanisms and the following detailed description of one of the mechanisms is believed to be sufficient to a complete understanding of the invention.

The units selector relay 173 and the mechanism associated therewith for controlling the operation of the clutch 163 are shown in detail in Fig. 4. Secured to the vertical shaft 164 is a bevel gear 174 which meshes with a similar gear 175 secured to a stud shaft 176 rotatably journaled in a supporting plate 178 secured to the main frame 160. A driving member 180 of the clutch 163 is secured to the stud shaft 176 and a driven member 181 of the clutch is slidably keyed to the horizontal shaft 156. The driven clutch member 181 is provided with the usual peripheral groove 182 for accommodating a bifurcated end 183 (Fig. 12) of a clutch operating lever 184 which is pivotally supported at its opposite end upon a suitable bracket 185 secured to the supporting plate 178. The bracket 185 also serves as a means for supporting the selector relay 173, the mounting 187 of the relay being rigidly secured to this bracket, as clearly shown in Fig. 4.

An elongated armature 188 of the relay 173 is pivoted at one end as indicated at 190 (Fig. 4) and is provided at its opposite end with a latch or hook portion 192 which normally projects through an elongated slot 193 formed in the clutch operating lever 184 (Fig. 12). The latch 192 is adapted to engage the far side of the lever 184 so as to lock the driven member 181 of the clutch in a disengaged position against the tension of a compression spring 194 interposed between the clutch lever 184 and the relay mounting 187. The construction is such that upon the energization of the relay 173 its armature 188 is drawn upwardly (Fig. 4) causing the latch 192 to become disengaged from the clutch operating lever 184, whereupon the driven clutch member 181 is moved into operative engagement with the driving clutch member 180 by the compression spring 194.

It is obvious from the construction above described that upon the engagement of the clutch 163 the horizontal shaft 156 is driven in synchronism with the card feed mechanism through the continuously driven vertical shaft 164. The shaft 156 is driven in a clockwise direction (Fig. 13) and during its rotation the selector brushes carried thereby are selectively engaged with certain predetermined terminals of the associated selector arcs according to the extent of rotation of the shaft 156 which in turn is controlled by the relay 173 through the clutch 163. Upon the de-energization of the relay 173 its armature 188 is moved downwardly to its locking position by a tension spring 196 which, as clearly shown in Fig. 4, is secured, at one end, to an arm 197 attached to the relay armature 188 and is fastened, at its opposite end, to an arm 198 formed integral with the relay arm mounting 187.

Figure 1:
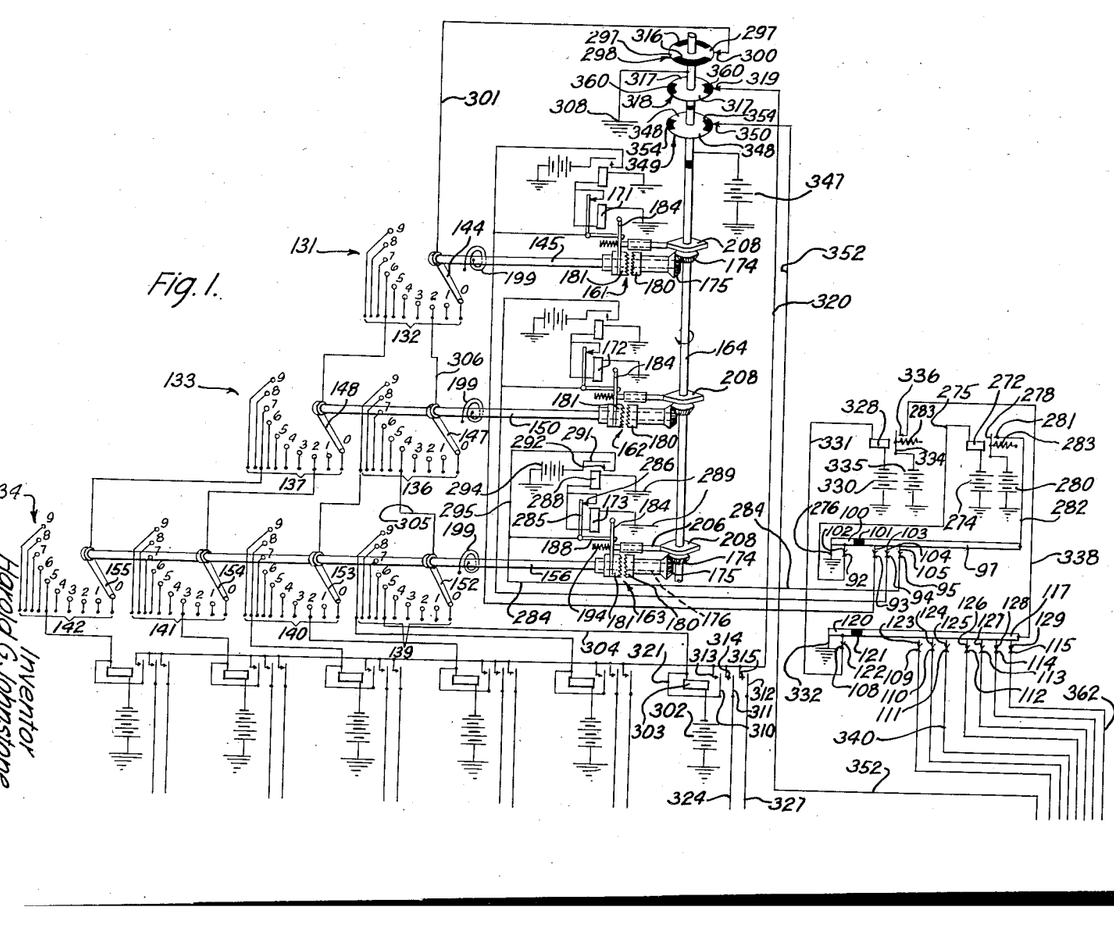
Figs. 1 and 2 are general diagrammatic figures which when viewed together with Fig. 2 positioned immediately below Fig. 1 illustrate the operation of the improved tabulating system.

Upon the disengagement of the clutch 163, a spiral clock spring 199 (Figs. 1 and 13) serves to rotate the shaft 156 in a counter-clockwise direction (Fig. 13) thereby returning the selector brushes to their normal positions wherein they engage the zero (0) terminals of the selector arcs as shown in Figs. 1 and 13. One end of the spring 199 is secured to the shaft 156 and its opposite end is adjustably secured to an annular flange 201 formed integral with the shaft supporting bracket 158. A spring pad 200 (Fig. 14) is provided for minimizing the shock to which the selector brushes are subjected upon being returned to their normal positions by the clock spring 199. A collar 202 secured to the shaft 156 is provided with a laterally projecting lug or finger 203 which is arranged to engage one end of a pin 204 slidably journaled in the frame 160 (Fig. 14). The opposite end of the pin 204 engages the spring pad 200 which is secured on the rear side of the frame 160.

Means is provided for causing the disengagement of the clutch 163 (if previously engaged) after each cycle of operation or, in other words, twice during each revolution of the vertical shaft 164. An adjustable push rod or pin 206 is slidably journaled in the supporting plate 178 (Figs. 4 and 15). One end of this pin is adapted to engage the clutch operating lever 184 and its opposite end is bifurcated to accommodate a roller 207 arranged to engage a cam 208 secured to the vertical shaft 164. A compression spring 209 serves to hold the roller 207 in contact with the cam 208. The cam 208 is provided with diametrically opposed projections 210—210 which are designed to move the pin 206 against the action of the spring 209 a distance sufficient to cause the disengagement of the driven clutch member 181 and its movement to a position wherein it is locked by the latch 192, as will be clearly understood by referring to Figs. 4 and 14.

*Registering mechanism*

Figure 2:
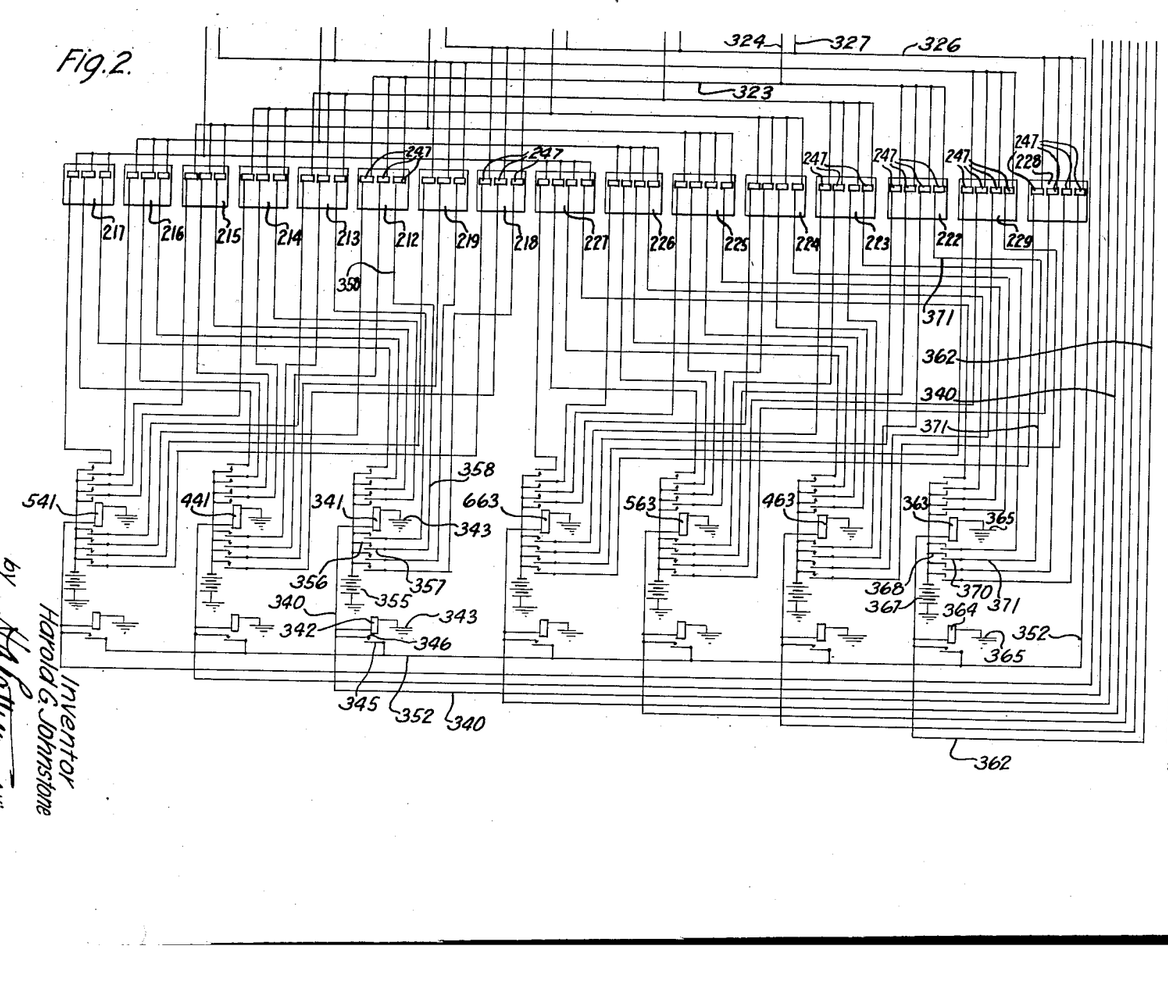

The registering mechanism 22 comprises a plurality of electro-magnetically controlled registers some of which are illustrated diagrammatically in Figs. 2 and 3. It will be understood that one or more registers may be provided for each individual order number or group of order numbers according to the data which are to be recorded. Thus in the present embodiment of the invention two registers are provided for each order number, one for recording the total number of parts manufactured and the other for recording the total manufacturing cost of such parts. Two additional registers are provided for each group of order numbers, one for summarizing the total number of parts manufactured and a certain group of order numbers and the other for summarizing the total manufacturing cost of such parts.

In order to more clearly illustrate the invention, but without intending to thereby limit its application, the electrical apparatus and the electrical connections for only six individual order numbers and two groups of order numbers are shown in the drawings (Figs. 1, 2 and 3). Accordingly only sixteen registers are shown, two for each individual order number and two for each group of order numbers. The registers which record the total number of parts manufactured are individually designated by the reference numerals 212 to 219, inclusive, and the registers which record the total manufacturing cost of the parts are individually designated by the reference numerals 222 to 229, inclusive.

As shown somewhat schematically in Fig. 3, the registers are all driven in synchronism with the card feed mechanism. Horizontal driving shafts 231, 231 of the registers are continuously driven from a vertically disposed shaft 232, which, in turn, is continuously driven from the horizontal shaft 57. Bevel gears 233, 233 secured to the register shafts 231 mesh with companion gears 234, 234 secured to the vertical shaft 232. A bevel gear 235 keyed to the vertical shaft 232 meshes with a companion gear 236 secured to the horizontal shaft 57.

Inasmuch as the registers are all similar in construction and operation it is believed that the following detailed description of one of the registers is sufficient to a complete understanding of the invention.

Figure 10:
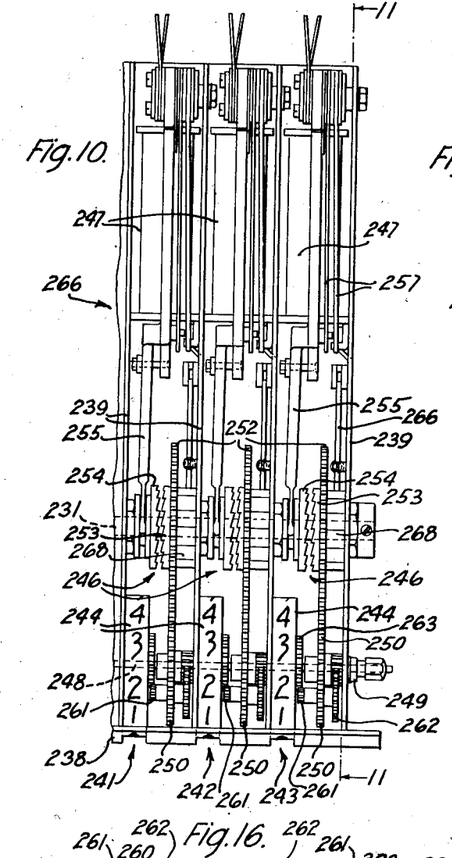
Fig. 10 is a fragmentary plan view of one of the improved registers.
Figure 11:
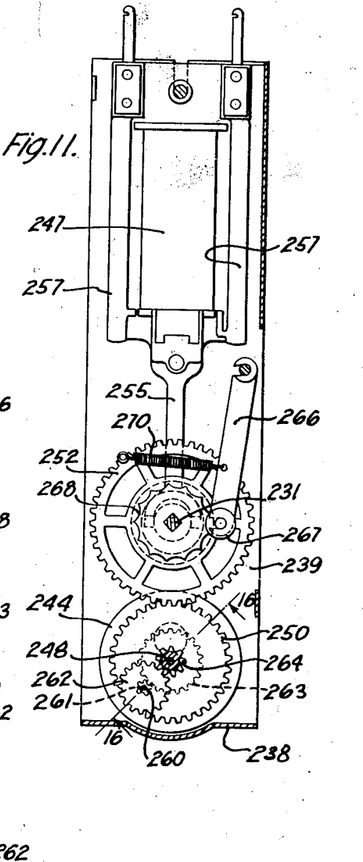
Fig. 11 is a vertical section taken on line 11—11 of Fig. 10.
Figure 16:
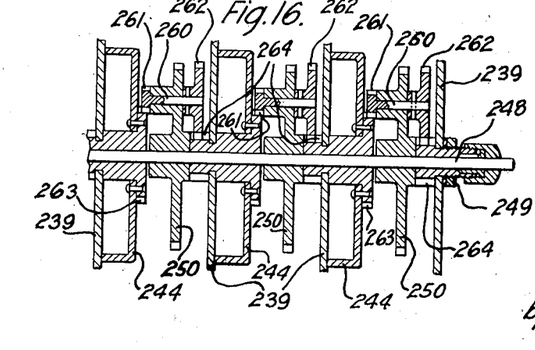
Fig. 16 is a fragmentary detail section taken on line 16—16 of Fig. 10.

Referring particularly to Figs. 10, 11 and 16 which illustrate one of the registers in detail, it will be observed that the operating mechanism of the register is enclosed within a suitable casing or housing comprising a face plate 238 and a plurality of spaced vertical plates 239, 239 provided with suitable apertures for accommodating the register driving shaft 231. Each register comprises a plurality of readily separable independent sections which are operatively interconnected through a train of planetary gears in the manner hereinafter described. Three of these sections are shown in Fig. 10 and are hereinafter referred to as a units registering section 241, tens registering section 242, and hundreds registering section 243. It is obvious, of course, that a lesser or greater number of register sections may be provided without departing from the spirit and general scope of the invention.

By referring to Fig. 10 it will be noted that the register sections 241, 242 and 243 are similarly constructed. For this reason like reference numerals have been employed to designate corresponding parts of the individual sections and it is believed that the following detailed description of one of the register sections is sufficient to a complete understandng of the invention.

Each register section comprises a registering element or indicator 244 individually actuated by suitable gearing from the shaft 231, its actuation being controlled by a suitable clutch 246 operated by an electro-magnetic relay 247 in accordance with the positions of the perforations in the record card designating the data to be tabulated. As best shown in Fig. 16, the indicators 244 are rotatably carried upon a horizontal shaft 248 which extends through suitable apertures provided therefor in the vertical plates 239 and is secured to the end vertical plates as indicated at 249.

Associated with each of the indicators 244 is a carrying device comprising a train of interconnected planetary gears constructed and arranged so that the actuation or rotation of any of the indicators causes a simultaneous rotation of the adjacent indicator of higher denomination in the ratio of ten to one. For example, while the units indicator makes one-tenth of a revolution, the tens indicator makes one-one-hundredth of a revolution, the hundreds indicator makes one-one-thousandth of a revolution, etc. It should be understood also that the indicators may be individually actuated directly from the shaft 231 simultaneously with their actuation by the carrying devices.

A gear 250 associated with each of the indicators 244 is rotatably mounted upon the shaft 248 and meshes with a gear 252 secured to or formed integral with a driven clutch member 253 rotatably supported upon the shaft 231. A driving member 254 of the clutch 246 is slidably keyed to the shaft 231 and is provided with the usual peripheral groove for accommodating an extended armature 255 of the relay 247. Upon the energization of the relay 247, its armature 255 is moved to the right (Fig. 10) against the action of leaf springs 257, 257, thereby causing the engagement of the driving clutch member 254 with the driven clutch member 253.

Each gear 250 carries an eccentrically disposed rotatable pin or stud shaft 260, and gears 261 and 262 are secured to this stud shaft on opposite sides of the gear 250. The gear 261 meshes with a gear 263 mounted upon the shaft 248 so as to be rotatable with the associated indicator 244 and the gear 262 meshes with a gear 264 mounted upon the shaft 248 so as to be rotatable with the adjacent indicator 244 of lower denomination. The arrangement is such that the indicators are actuated simultaneously with the actuation of indicators of lower denomination in ratios of one to ten, one to one hundred, etc.

A suitable centering stop is provided for each of the indicators, which, in the present embodiment of the invention, comprises a lever 266 pivoted at one end to the side plate 239 (Fig. 10). A roller 267 carried upon the free end of the lever 266 engages a notched disk 268 secured to or formed integral with the gear 252. The roller 267 is held in yielding engagement with the notched disk 268 by a tension spring 270 secured at one end to the lever 266 and attached at its opposite end to the side plate 239.

It is believed that a clear understanding of manner in which the selection and operation of the registers is controlled by the contact brushes in accordance with the positions of the perforations in the continuously moving record cards will be had from the following detailed description of the operation of the improved tabulating system.

Figure 17:
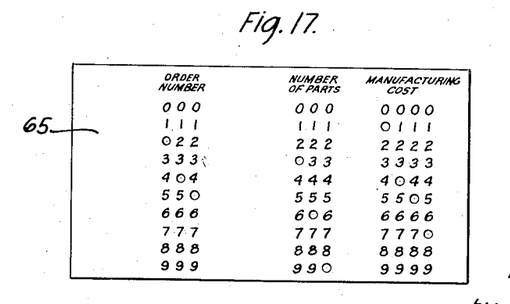
Fig. 17 is a detail view of one type of a perforated record card which may be employed in connection with the improved tabulating system.

The operation is as follows: The perforated record cards 65 are advanced, one at a time, from the bottom of a stack thereof contained within the hopper 64 in the manner hereinbefore described. As the advancing card passes under the brush carrier 97, it disengages the contact brushes 103 to 105 from their associated contact members 93 to 95 (Figs. 1 and 8). The edge of the card passes between the contact brush 102 and its associated contact member 92, causing the de-energization of a relay 272 (Fig. 1), the electrical operating circuit of which may be traced as follows:—From a grounded battery 274, through the winding of the relay 272, a conductor 275, the contact member 92, the contact brush 102, the brush carrying block 100 to ground 276. An armature 278 of the relay 272 is connected to a grounded battery 280 and a contact 281 of this relay is connected to the contact brushes 103, 104 and 105 by a conductor 282 and the brush carrying bar 97. Upon the de-energization of the relay 272, its armature 278 engages the associated relay contact 281 under the tension of a spring 283, thereby interconnecting the battery 280 with the contact brushes 103 to 105. As the card continues to advance, the contact brushes 103, 104 and 105 explore the columns in which the order number is perforated. Assuming, for example, that the first record card refers to Order Number 245, it will be understood that this number is designated upon the record card by suitable perforations through the numbers 2, 4 and 5 appearing in the first, second and third columns, respectively, under the heading "Order Number," (Fig. 17).

It will be obvious that as the record card is advanced the perforations designating the order number pass under the corresponding contact brushes 103 to 105. These brushes make contact with the associated contact members 93 to 95 thereby closing certain electrical operating circuits of the register selecting mechanism as hereinafter described. Thus, upon the perforation designating the units digit (5) of the assumed "Order Number" (245) arriving under the contact brush 105, an electrical circuit is completed, which may be traced as follows: From the grounded battery 280 through the relay armature 278, the relay contact 281, the conductor 282, the brush carrying bar 97, the contact brush 105, the associated contact member 95, a conductor 284, an armature contact spring 285 of the units selector relay 173, an associated relay contact 286, through the windings of the selector relay 173 and an associated "help" relay 288 to ground 289. The closing of the circuit just described causes the energization of the units selector relay 173, whereupon its armature 188 is drawn upwardly, thereby releasing the clutch operating lever 184. It will be understood that the function of the relatively fast and sensitive "help" relay 288 is to insure the operation of the somewhat sluggish selector relay 173 which may not have had time to operate before the perforation has passed the contact brush 105. As shown in the circuit diagram (Fig. 1), the "help" relay 288 is connected in parallel with the selector relay 173 in such manner that it is energized simultaneously with the selector relay when the above described circuit is closed. Upon the energization of the "help" relay 288, its armature 291 is drawn in contact with an associated relay contact 292 thereby establishing an electrical circuit which may be traced as follows: From a grounded battery 294 through the relay armature 291, the associated relay contact 292, a conductor 295, the armature contact spring 285 of the selector relay 173, the associated relay contact 286, through the windings of the selector relay 173 and the "help" relay 288 to the ground 289.

From the above-described circuit arrangement it will be understood that the "help" relay 288 holds the power or battery 294 on the winding of the selector relay 173 until this relay operates to release the clutch lever 184, whereupon the power is disconnected by the armature contact spring 285 becoming disengaged from the associated relay contact 286. It will also be noted that by this arrangement the power passing through the contact brushes 103 to 105 may be reduced to the small amount required to operate the very sensitive "help" relay 288.

Upon the release of the clutch operating lever 184, the clutch 163 is engaged under the pressure of the spring 194 thereby starting the rotation of the shaft 156 in synchronism with the card feed mechanism from the continuously rotating vertical shaft 164. The units selector brushes 152 to 155, which normally engage the zero (0) contact terminals of their associated units selector arcs, are carried by the shaft 156 over the contact terminals 1, 2, 3, etc., of the selector arcs. As soon as the units selector brushes arrive at the No. 5 contact terminals of their associated selector arcs, the driven clutch member 181 is disengaged by the cam 208 and is locked in this position by the extended armature 188 of the selector relay 173. The shaft 156 is thereupon returned to its normal position by the spiral clock spring 199.

It will be obvious that upon the perforation designating the tens digit (4) of the assumed "Order Number" (245) arriving under the corresponding contact brush 104, the tens selector relay 172 is operated to advance the tens selector brushes 147 and 148 to the No. 4 terminals of the associated selector arcs 136 and 137 in the same manner as described above in connection with the units selector relay 173. In a similar manner, the hundreds selector relay 171 is operated when the perforation designating the hundreds digit (2) of the assumed "Order Number" (245) arrives under the corresponding contact brush 103 causing the hundreds selector brush 144 to be advanced to the No. 2 terminal of the hundreds selector arc 132. It will be understood that in each instance the particular contact terminal which is engaged by the associated selector brush is dependent upon the time that the associated clutch is engaged which in turn, is controlled through the corresponding selector relay by the position of the corresponding perforation in the card.

The operation of each of the selectors is so synchronized with the card feed mechanism that the units, tens and hundreds selector brushes arrive at the selected contact terminals of their associated selector arcs at the same time. Thus, in the instant example, it will be obvious that at the moment the units selector brushes arrive at the No. 5 contact terminals of their associated selector arcs, the tens selector brushes will have arrived at the No. 4 terminals of their associated selector arcs and the hundreds selector brush will have arrived at the No. 2 terminal of its associated selector arc. At this time the vertical shaft 164 will have made one-half of a revolution, having started from the position shown in Fig. 1, and it will be noted that the clutches 161, 162 and 163 will be disengaged simultaneously by the cams 208. At the same time, a conducting segment 297 of a contact disk 298 carried upon the shaft 164 and insulated therefrom will be engaged by a contact brush 300 which is interconnected with the hundreds selector brush 144 by a flexible conductor 301. An electrical circuit is thus established which may be traced as follows: From a grounded battery 302 through the winding of a relay 303, a conductor 304, the No. 5 contact terminal of the units selector arc 139, the units selector brush 152, a conductor 305, the No. 4 terminal of the tens selector arc 136, the tens selector brush 147, a conductor 306, the No. 2 terminal of the hundreds selector arc 132, the hundreds selector brush 144, the conductor 301, the contact brush 300, the conducting portion 297 of the contact disk 298 to ground 308. The closing of the circuit just described causes the energization of the relay 303 whereupon its armatures 310, 311 and 312 are drawn in contact with associated relay contacts 313, 314 and 315 respectively.

The units, tens, and hundreds selector brushes are simultaneously returned to their normal positions by the clock springs 199 immediately after arriving at the selected contact terminals of their associated selector arcs. At about the same time, an insulating segment 316 of the continuously rotating contact disk 298 comes in contact with the associated contact brush 300 and thus the above described circuit through the winding of the relay 303 is opened almost immediately after it is established. However, the grounded battery 302 is held on the winding of the relay 303 in the following manner. Before the above described circuit through the winding of relay 303 is opened, a conducting segment 317 of a contact disk 318, carried upon the shaft 164 and insulated therefrom, will have engaged a contact brush 319 which is interconnected with the relay contacts 313, 314 and 315 by a flexible conductor 320. An electrical circuit is thus established which may be traced as follows: From the grounded battery 302 through the winding of the relay 303, a conductor 321, the locking armature 310 of the relay 303, the associated relay contact 313, the conductor 320, the contact brush 319, the conducting portion 317 of the contact disk 318 to the ground 308. The circuit just described holds the battery 302 on the winding of the relay 303 whereby its armatures 311 and 312 are "locked" in contact with the associated relay contacts 314 and 315, respectively.

It will be noted by referring to Figs. 1 and 2 that the relay 303, when "locked" under the control of the contact disk 318 in the manner above described, conditions the electrical operating circuits of certain of the registers in accordance with the order number designated upon the record card. Thus, in the instant example, the electrical operating circuits of the registers 212 and 222 which tabulate the manufacturing data relating to Order Number 245, are conditioned in the following manner. The operating electromagnets or relays 247 of these registers are connected to ground 308 through flexible conductors 323 and 324, the armature 311 of the relay 303, the associated relay contact 314, the conductor 320, the contact brush 319 and the conducting portion 317 of the contact disk 318. In a similar manner, the operating electromagnets or relays 247 of the group registers 218 and 228, which summarize the manufacturing data for a certain group of order numbers including the assumed "Order Number" (245), are connected to ground 308 through flexible conductors 326 and 327, the armature 312 of the relay 303, the associated relay contact 315, the conductor 320, the contact brush 319 and the conducting portion 317 of the disk 318.

Upon the vertical shaft 164 completing one-half of a revolution the feed fingers 72 of the card feed mechanism start to advance the next record card from the bottom of the stack and it will be understood that while each card is advanced in succession under the contact brushes 103 to 105 the electrical operating circuits of certain of the registers are conditioned in accordance with the order number as designated by the perforations on the card as above described. In the meantime the first or preceding card continues to advance and passes under the contact brushes 123 to 129 thereby disengaging these contact brushes from their associated contact members 109 to 115. The edge of the card passes between the contact brush 122 and its associated contact member 108 causing the de-energization of a relay 328, similar to the relay 272. As shown in Fig. 1, the relay 328 is connected in an electrical operating circuit which may be traced as follows: From a grounded battery 330 through the winding of the relay 328, a conductor 331, the contact member 108, the contact brush 122, the brush carrying block 120, to ground 332. An armature 334 of the relay 328 is connected to a grounded battery 335, and a contact 336 of this relay is connected to the contact brushes 123 to 129 by a conductor 338 and the brush carrying bar 117. Upon the de-energization of the relay 328, its armature 334 engages the associated relay contact 336 thereby interconnecting the battery 335 with the contact brushes 123 to 129.

As the card continues to advance the contact brushes 123, 124 and 125 explore the columns in which the number of parts manufactured is designated by perforations, and the contact brushes 126 to 129 explore the columns in which the manufacturing cost of the parts is designated by perforations. Assuming for example that under the assumed Order Number 245, three hundred sixty nine (369) parts were manufactured at a total cost of $14.57, it will be understood that the number of parts (369) is designated upon the record card by suitable perforations through the numbers 3, 6, and 9 appearing in the first, second and third columns, respectively, under the heading "Number of parts", and the manufacturing cost ($14.57) is designated upon the record card by suitable perforations through the numbers 1, 4, 5 and 7 appearing in the first, second, third and fourth columns, respectively, under the heading "Manufacturing cost" (Fig. 17).

It will be obvious that as the record card is advanced the perforations designating the number of parts manufactured pass under the corresponding contact brushes 123 to 125. These brushes make contact through the perforations with the associated contact members 109 to 111 thereby completing certain of the previously conditioned electrical operating circuits of the registers 212 and 218 in a manner hereinafter described. Thus, upon the perforation designating the units digit (9) of the assumed "Number of parts" (369) arriving under the corresponding contact brush 125, an electrical circuit is established which may be traced as follows: From the grounded battery 335 through the armature 334 of the relay 328, the associated relay contact 336, the conductor 338, the brush carrying bar 117, the contact brush 125, the associated contact member 111, a conductor 340, through the windings of a relay 341 and an associated "help" relay 342 to ground 343. The closing of the circuit just described causes the energization of the relay 341 whereupon its armatures are drawn in contact with the associated contacts thereby completing certain of the previously conditioned electrical operating circuits of the register 212. It will be understood that the function of the relatively fast and sensitive "help" relay 342 is to insure the operation of the larger relay 341 which may not have had time to operate before the perforation has passed the contact brush 125. As shown in the circuit diagram (Figs. 1 and 2) the "help" relay 342 is connected in parallel with the larger relay 341 in such manner that it is energized simultaneously with the relay 341 when the above described circuit is closed. Upon the energization of the "help" relay 342 its armature 345 is drawn in contact with an associated relay contact 346 thereby establishing an electrical circuit which may be traced as follows: From a grounded battery 347 (top of Fig. 1) through a conducting segment 348 of a contact disk 349 carried upon the vertical shaft 164 and insulated therefrom, through an associated contact brush 350, a flexible conductor 352, the armature 345 of the "help" relay 342, the associated relay contact 346, the conductor 340, the windings of the relay 341 and the "help" relay 342 to ground 343.

From the above described circuit arrangement it will be understood that the "help" relay 342 holds the power or battery 347 on the winding of the relay 341 under the control of the contact disk 349 until the numerals zero (0) appearing near the top of the record card arrive under the contact brushes 123 to 125 at which time an insulating segment 354 of the contact disk 349 engages the associated contact brush 350 thereby disconnecting the grounded battery 347 from the relay 341. Thus, it will be obvious that upon the units digit (9) of the assumed "Number of parts" (369) arriving under the corresponding contact brush 125, a previously conditioned electrical operating circuit of the register 212 is completed. This circuit may be traced as follows: From a grounded battery 355 (bottom of Fig. 2) through a contact 356 of the relay 341, an associated armature 357, a conductor 358, the winding of the units indicator operating relay 247 of the register 212, the conductors 323 and 324, the armature 311 of the relay 303, the associated relay contact 314, the conductor 320, the contact brush 319, a conducting segment 317 of the contact disk 318 to ground 308. The closing of the circuit just described causes the energization of the units indicator operating relay 247 of the register 212 whereupon its associated armature 255 (Fig. 10) moves to the right thereby engaging the driving clutch member 254 with the driven clutch member 253. The units indicator 244 of the relay 212 is thereby rotated, through the train of gears hereinbefore described, from the continuously driven shaft 231 which, as described above, is driven in synchronism with the card feed mechanism.

The above described arrangement is such that upon the units indicator 244 having been rotated an amount sufficient to register or add nine (9), the numerals zero (0) appearing near the top of the record card will have arrived under the contact brushes 123 to 125. At this time an insulating segment 354 of the contact disk 349 engages the contact brush 350 thereby interrupting the circuit through the winding of the relay 341. At the same time, an insulating segment 360 of the contact disk 318 engages the contact brush 319 thereby interrupting the circuit through the winding of the relay 303. The relays 341 and 303 are thus de-energized whereupon their armature contacts open in a well known manner to interrupt the electrical operating circuit of the units indicator relay 247 of the register 212, thus causing the de-energization of this relay.

Upon the de-energization of the units indicator relay 247 its armature 255 (Fig. 10) is moved to the left by the associated leaf springs 257 thereby disengaging the driving clutch member 253 from the driven clutch member 254 thus stopping the rotation of the units indicator 244. It will be obvious that the spring pressed centering stop 266 serves to prevent "over-running" of the indicator 244 upon the disengagement of the clutch 246.

Upon the perforation designating the tens digit (6) of the assumed "Number of parts" (369) arriving under the corresponding contact brush 124, it will be understood that the previously conditioned electrical operating circuit of the tens indicator relay 247 of the register 212 will be completed by the operation of a relay 441, similar to the relay 341, in the same manner as described above in connection with the units indicator 247 and the tens indicator 244 of the register 212 will thereupon be rotated an amount sufficient to register or add sixty (60). In a similar manner, the hundreds indicator relay 247 of the register 212 is operated through the energization of a relay 541, similar to the relays 341 and 441, when the perforation designating the hundreds digit (3) of the assumed "Number of parts" (369) arrives under the corresponding contact brush 123 causing the hundreds indicator 244 to be rotated an amount sufficient to register or add three hundred (300). Thus, it is apparent that a total of three hundred sixty nine (369) is registered or accumulated in the register 212 during the continuous advancement of the record card under the brushes 123 to 125.

During the same time, the brushes 126 to 129 explore the column of the advancing card in which the manufacturing cost is designated by suitable perforations as shown in Fig. 17. Upon the perforations designating the manufacturing cost arriving under their corresponding contact brushes 126 to 129, these contact brushes make contact through the perforations with the associated contact members 112 to 115 thereby completing certain of the previously conditioned electrical operating circuits of the registers 222 and 228 as will now be described. Thus, upon the perforation designating the units digit (7) of the assumed "Manufacturing cost" ($14.57) arriving under the corresponding contact brush 129 an electrical circuit is established which may be traced as follows: From the grounded battery 335 through the armature 334 of the relay 328, the associated relay contact 336, the conductor 338, the brush carrying bar 117, the contact brush 129, the associated contact member 115, a conductor 362, through the windings of a relay 363 and an associated "help" relay 364 to ground 365. The closing of circuit just described causes the energization of the relay 363, the operation of this relay being insured by the "help" relay 364 in the same manner as described above in connection with the relay 342. Thus it will be obvious that upon the perforation designating the units digit (7) of the assumed "Manufacturing cost" ($14.57) arriving under the corresponding contact brush 129 a previously conditioned electrical operating circuit of the register 222 is completed. This circuit may be traced as follows: From a grounded battery 367

(lower right portion of Fig. 2) through a contact 368 of the relay 363, an associated relay armature 370, a conductor 371, the winding of the units indicator operating relay 247 of the register 222, the conductors 323 and 324, the armature 311 of the relay 303, the associated relay contact 314, the conductor 320, the contact brush 319, a conducting portion 317 of the contact disk 318 to ground 308. The closing of the circuit just described causes the energization of the units indicator relay 247 of the register 222 whereupon the units indicator 244 of this register is rotated an amount sufficient to register or add seven cents ($.07) in the same manner as described in connection with the units indicator register 212.

Upon the perforation designating the tens digit (5) of the assumed "Manufacturing cost" ($14.57) arriving under the corresponding contact brush 128, it will be understood that the previously conditioned electrical operating circuit of the tens indicator relay 247 of the register 222 will be completed by the operation of a relay 463, similar to the relay 363, in the same manner as described above in connection with the units indicator relay 247, and the tens indicator 244 of the register 222 will thereupon be rotated an amount sufficient to register or add fifty cents ($.50). In a similar manner the hundreds indicator relay 247 of the register 222 is operated through the energization of a relay 563, similar to the relay 363, when the perforation designating the hundreds digit (4) of the assumed "Manufacturing cost" ($14.57) arrives under the corresponding contact brush 127 causing the hundreds indicator 244 of the register 222 to be rotated an amount sufficient to register or add four dollars ($4.00). Likewise, the thousands indicator relay 247 of the register 222 is operated through the energization of a relay 663, similar to the relay 363, when the perforation designating the thousands digit (1) of the assumed "Manufacturing cost" ($14.57) arrives under the corresponding contact brush 126 causing the thousands indicator 244 to be rotated an amount sufficient to register or add ten dollars ($10.00). Thus, it is apparent that $14.57 is registered or accumulated in the register 222 during the continuous advancement of the record card under the brushes 126 to 129.

Simultaneously with the recording of the data relating to a particular order number in certain individually assigned registers, the data are summarized according to certain groups of order numbers in certain group registers. Thus, in the above example, the data relating to the assumed "Order Number" (245) are accumulated in the group registers 218 and 228 simultaneously with the recording of these data, as above described, in the corresponding registers 212 and 222 assigned to Order Number 245. The group registers are operated in the same manner as the registers 212 and 222 described above and therefore a further detailed description of their operation is not believed to be essential to a complete understanding of the invention.

It should be understood that the invention is not limited to the specific embodiment herein illustrated and described but is capable of various other applications within the scope of the appended claims.

What is claimed is:

1. In a tabulating system, a plurality of electrical operating circuits, a circuit selecting mechanism including a plurality of banks of selector switches each selector switch comprising a plurality of passive contacts and a co-operating contact element movable with respect thereto, means for moving the contact elements of each of the banks of selector switches independently to engage simultaneously predetermined passive contacts, and means thereafter effective at a predetermined time during said movement for energizing certain of the electrical operating circuits in accordance with the positions of the contact elements at that time.

2. In a tabulating system, a plurality of registers, controllers for said registers, a register selector, electrical operating circuits for the register selector, a selector switch for controlling the selector operating circuits, controllers for the selector switch, the actuation of the selector switch controllers serving to operate the selector switch to select certain of the registers, and the actuation of the register controllers serving to operate the selected registers.

3. In a tabulating system, a plurality of registers, electrical operating circuits for the registers, a plurality of controllers for controlling the register operating circuits, a plurality of register selectors, electrical operating circuits for the register selectors, a plurality of controllers for controlling the selector operating circuits, the actuation of the selector operating controllers serving to actuate the selectors to select certain of the registers, and the actuation of the register operating circuit controllers serving to operate the selected registers.

4. In a tabulating system, a plurality of electrical operating circuits, a circuit selecting mechanism comprising a selector switch having a plurality of passive contacts and a cooperating contact element movable with respect thereto, a constantly moving member, means for connecting the contact element to the constantly moving member of the selector switch to cause the contact element to successively engage the passive contacts, and means thereafter effective at a predetermined time in each cycle of movement of said constantly moving member for energizing certain of the electrical operating circuits in accordance with the position of the contact element at that time.

5. In a tabulating system, a plurality of electrical operating circuits, a circuit selecting mechanism including a plurality of banks of selector switches, each selector switch comprising a plurality of passive contacts and a cooperating contact element movable with respect thereto, means for independently moving the contact elements of each bank of selector switches to engage successively predetermined ones of its associated passive contacts, and means effective at a predetermined time during the movement of said movable contact elements for energizing certain of the electrical operating circuits.

6. In a tabulating system, a plurality of electrical operating circuits, a circuit selecting mechanism including a plurality of banks of selector switches, each selector switch of each bank comprising a plurality of passive contacts and a cooperating contact element movable with respect thereto, means for moving the contact elements of each of the banks of selector switches independently to successively engage predetermined ones of the associated passive contacts, and means controlled by the position of the movable contact element and effective when the contact elements engage the last contact of the contacts to be engaged thereby for energizing certain of the electrical operating circuits.

7. In a tabulating system, a plurality of electrical operating circuits, a circuit selecting mechanism including a plurality of banks of selector switches, each selector switch comprising a plurality of passive contacts and a cooperating contact element movable with respect thereto, means for moving the contact element of each bank of selector switches independently to successively engage predetermined ones of the associated passive contacts, and means effective when the contact element engages the last of the predetermined contacts to be engaged thereby for energizing certain of the electrical operating circuits depending on the positions of the movable contact elements at that time.

8. In a circuit selecting mechanism, a plurality of circuit controllers, means for driving each of the circuit controllers, independently, and means cooperating with the circuit controllers and effective after the driving of the circuit controller starts for establishing a predetermined circuit in accordance with the relative positions of said controllers at a predetermined time in the operation thereof.

9. In a circuit selecting mechanism, a common driving means, a plurality of circuit controllers independently operable from the common driving means, and means cooperating with the circuit controller and operable after the circuit controllers start to operate for establishing a predetermined circuit in accordance with the relative positions of the controllers at a predetermined time in the operation thereof.

10. In a circuit selecting mechanism, a plurality of circuit controllers operable independently, and a means for determining the selected circuit as indicated by the relative positions of said controllers at the same time in each cycle of operation.

11. In a circuit selecting mechanism, a plurality of circuit controllers operable independently and arranged to be engaged independently and driven synchronously, and a means for determining the selected circuit as indicated by the relative positions of said controllers at a predetermined time in the cycle of operation.

12. In a card controlled circuit selecting mechanism, a common driving means, a plurality of circuit controllers operable by the common driving means and connectable to said driving means individually, and a means for determining the selected circuit as indicated by the relative positions of said controllers at a predetermined time in the cycle of operation.

13. In a card controlled circuit selecting mechanism a common driving means, a plurality of circuit controllers operable by the common driving means and connectable to said driving means individually, means for determining the selected circuit as indicated by the relative positions of said controllers at a predetermined time in the cycle of operation, and means controlled by the card for determining the time of engagement of said controllers with the driving means.

14. In a circuit selecting mechanism, a plurality of circuit controllers, a common driving means, means for engaging said controllers with said driving means independently, and a means for establishing the selected circuit as indicated by the relative positions of said controllers at a predetermined time in the cycle of operation.

15. In a circuit selecting mechanism, a plurality of circuit controllers, a common driving means, means for selectively engaging said controllers with said driving means independently, and means for establishing the selected circuit as indicated by the relative positions of said controllers at a predetermined time in the cycle of operation.

16. In a card controlled circuit selecting mechanism, a plurality of circuit controllers, a common driving means, means for selectively engaging said controllers with said driving means independently in accordance with information in a card, and means for establishing the selected circuit as indicated by the relative positions of said controllers at a predetermined time in the cycle of operation.

17. In a card controlled circuit selecting mechanism, a plurality of circuit controllers, a common driving means therefor, means for independently engaging each of the controllers with the driving means at points in the cycle of operation determined by the card, and means for establishing the circuit selected by the controllers at a predetermined time in the cycle of operation.

18. In a card controlled circuit selecting mechanism, a plurality of circuit controllers, means common to all the controllers for driving them synchronously, means controlled by a card for connecting the controllers to the driving means to drive them through varying distances determined by the time they were connected to the common driving means, and means for establishing the selected circuit as indicated by the positions of the controllers at a predetermined time in the cycle of operation.

19. In a tabulating system, a plurality of electrical operating circuits, a circuit selecting mechanism comprising a selector switch having a plurality of passive contacts and a cooperating contact element movable with respect thereto, a constantly moving member, means for connecting the contact element to the constantly moving member of the selector switch to cause the contact element to successively engage the passive contacts, means operable in accordance with information in a record card for determining the time when the contact element starts, and means effective at predetermined time during said movement for energizing certain of the electrical operating circuits in accordance with the position of the contact element at that time.

20. In a tabulating system, a plurality of electrical operating circuits, a circuit selecting mechanism comprising a selector switch having a plurality of passive contacts and a cooperating contact element movable with respect thereto, means for moving the contact element through predetermined distances as determined by information in a record card to engage certain of the passive contacts, and means effective at a predetermined time during said movement for energizing certain of the electrical operating circuits in accordance with the position of the contact element at that time.

21. In a tabulating system, a plurality of electrical operating circuits, a circuit selecting mechanism including a plurality of banks of selector switches, each switch comprising a plurality of passive contacts and a cooperating contact element movable with respect thereto, means for independently moving the contact elements of each bank of selector switches to engage successively predetermined ones of its associated passive contacts, and means effective at a predetermined time during said movement for completing a circuit through all of the banks whose contacts have been moved for energizing certain of the electrical operating circuits.

In witness whereof, I hereunto subscribe my name this 18th day of August A. D., 1928.

HAROLD GLENN JOHNSTONE.